May 24, 1938. C. S. ASH 2,118,694
WHEEL CONSTRUCTION
Filed Jan. 27, 1936
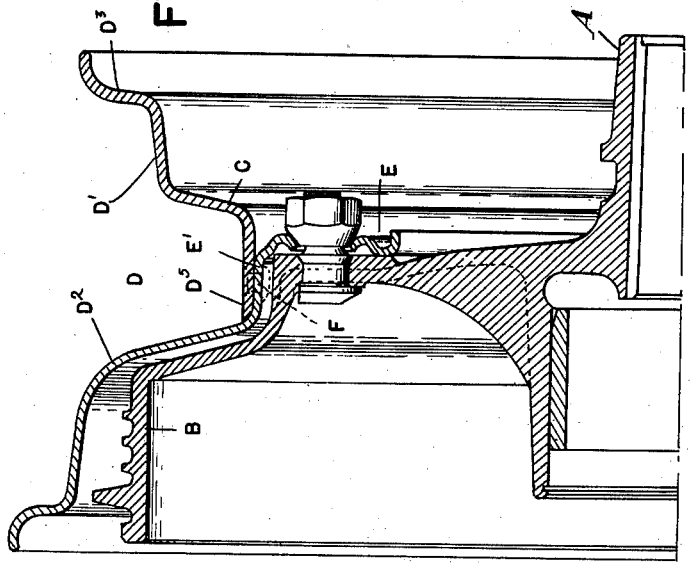
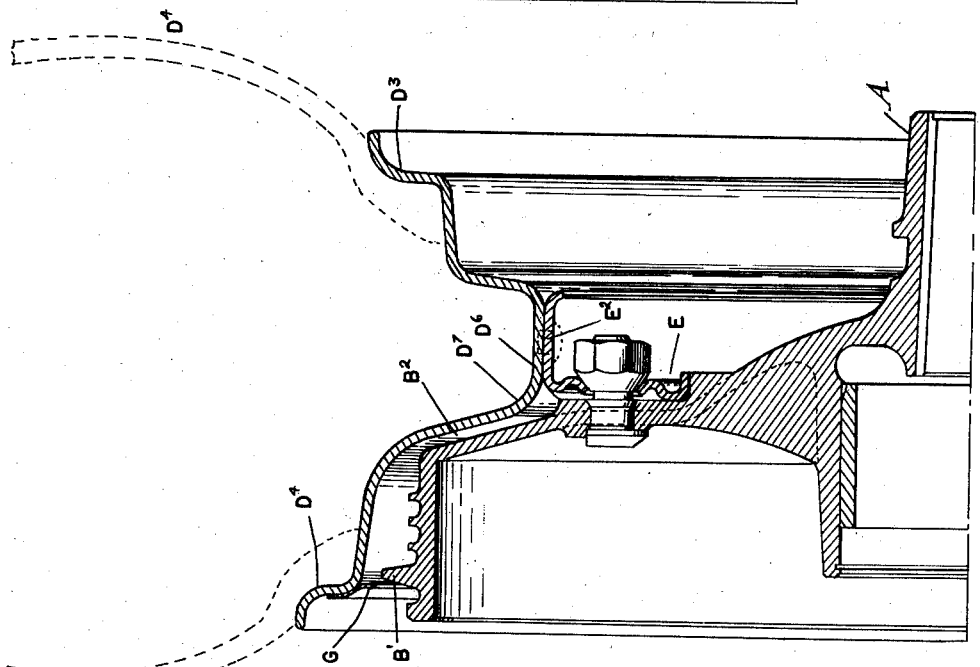
INVENTOR
CHARLES S. ASH
BY Whittemore Hulbert
Whittemore & Belknap
ATTORNEYS Patented May 24, 1938

2,118,694

UNITED STATES PATENT OFFICE 2,118,694

WHEEL CONSTRUCTION

Charles S. Ash, Milford, Mich., assignor to Kelsey-Hayes Wheel Company, Detroit, Mich., a corporation of Delaware Application January 27, 1936, Serial No. 61,103

6 Claims. (Cl. 301—97)

The invention relates to vehicle wheels and more particularly that type designed for use with the so-called peg-leg tires. In the present state of the art, there has been a progressive decrease in diameter of wheels, an increase in the cross-sectional diameter of tires and an increase in brake power necessitating enlargement of the brake drums. Due to these changes, it is sometimes difficult to design a wheel which will give clearance for the brake drum and one method of accomplishing this is to use the so-called peg-leg tires. With these the outer wall of the tire is of greater depth than the inner wall thereof so that the diameter of the rim for the outer bead seat is less than that for the inner bead seat. This gives a larger clearance within the inner portion of the rim for accommodating the brake drum.

It is the object of the present invention to obtain an improved construction of wheel designed for use with peg-leg tires and more particularly to lighten the construction to decrease the cost of manufacture and to obtain certain other advantages. To this end, the invention consists in the construction as hereinafter set forth.

In the drawing:

Figure 1 is a radial cross-section through a portion of a wheel of my improved construction;

Figure 2 is a similar view showing a modification.

As illustrated, A is the wheel hub, B the brake drum shown as formed integral with the hub and C is a demountable wheel of my improved construction. This comprises a rim D for receiving a peg-leg tire and an annular member E within the rim forming the demountable connection with the drum.

With the peg-leg type of tire the tread is not placed at the center of the cross-section but is offset forward thereof. As a consequence, the stresses which are transmitted through the outer bead seat are considerably greater than those transmitted through the inner bead seat, so that lighter gage metal may be used for the latter than the former. Furthermore, as the outer wall of the tire is of considerably greater radial depth than the inner wall, and as the depth of a flange on a wheel rim is proportional to the cross-section of the tire the height of the flange adjacent to the inner bead can be made less than the height of the flange adjacent to the outer seat. Taking advantage of these conditions, I have, as shown in Figure 1, designed a rim in which the outward portion is made of heavier gage metal than the inner portion and in which the outer flange is of greater depth than the inner flange. This is preferably accomplished by separately forming the outer and inner portions D' and D² of the rim by pressing the same from sheet metal blanks of different gage metal. Each of these portions is fashioned to form a well or drop-center, a bead seat and an outwardly extending flange. The flange D³ of the portion D' is of greater height than the flange D⁴ of the portion D². The annular portion E can also be formed integral with the rim portion D² being fashioned to have a substantially cylindrical portion E' telescopically engaging a cylindrical portion D⁵ of the rim portion D' and secured thereto by rivets F or other suitable means. These two portions E' and D³ form the radially inward wall of the well or drop-center of the rim, which is thus reinforced at the point which is subjected to highest stress. A wheel constructed as just described is considerably lighter than one in which both outer and inner portions of the rim are of the same thickness of metal and where the inner rim flange is of the same height as the outer flange. Also, the fact that the bolting-on flange E is formed integral with the portion D² of the rim effects a further economy in the cost of manufacture.

With the modified construction shown in Figure 2 the rim has its outer and inner portions integral and of substantially uniform thickness. However, the rear flange D⁴ is less in height than the outer flange D³ as is the case with the construction shown in Figure 1. The bolting-on flange E is provided with a cylindrical portion E² which fits within the bottom portion D⁶ of the rim and is riveted thereto.

To facilitate dissipation of heat from the brake drum, the latter is preferably provided with annular outwardly extending fins B' which therefore increase the outside dimension of the drum. However, with the peg-leg construction of tire the inner bead seat may be of sufficient diameter to clear these fins and the rim is also fashioned with respect to the drum so as to leave an air channel B² therebetween. To prevent accumulation of dust on the outer face of the drum and in this air channel a dust guard G is preferably provided, this being attached to the rim flange D⁴ and extending radially inward therefrom adjacent to the highest fin B'. There is, however, sufficient clearance so as to permit of mounting and demounting the wheel upon the drum without interference between the fin B' and dust guard G.

In the construction shown in Figure 2, where the outer and inner sides of the rim are integral, a large radius curve $D^7$ is preferably used between the portion $D^6$ and the outwardly extending portion. This facilitates the rolling of the rim while still leaving a sufficient length of the cylindrical portion $D^6$ for rigid attachment to the portion $E^2$.

With both constructions shown in Figures 1 and 2, the fact that the inner bead seat is of enlarged diameter with respect to the outer bead seat permits of using a larger diameter brake drum while still providing clearance for the rim. Also, in both constructions the rim is mounted upon the brake drum but is spaced therefrom so as to form an air channel therebetween.

What I claim as my invention is:

1. A rim designed for receiving a peg-leg tire, said rim having axially inner and outer portions each provided with a bead seat and a retaining flange, the bead seat on the inner portion being of larger diameter than the bead seat on the outer portion and having a tire retaining flange of lesser height than the flange on the outer portion.

2. A rim designed for receiving a peg-leg tire comprising an axially outer portion having a bead seat of smaller diameter formed of metal of one gage and an axially inner portion having a bead seat of larger diameter formed of metal of a lighter gage, said portions being secured to each other at the center of the rim.

3. A rim of the drop-center type adapted to receive a peg leg tire, said rim comprising an axially outer member including a bead seat, a retaining flange and a well portion, an axially inner member comprising a bead seat, a retaining flange of lesser height than on said outer member and a well portion underlapping the well portion of said outer member and secured thereto.

4. A rim of the drop-center type designed to receive a peg-leg tire, said rim comprising an axially outer member including a bead seat, a retaining flange and a portion forming the side and radially inward wall of the well, an axially inner member including a bead seat, a retaining flange of lesser height than the flange on said axially outer member, a portion forming the rear side of the well and underlapping the radially inward portion of said outer member being secured thereto, and a portion extending radially inward and forming a bolting-on flange.

5. A drop-center rim designed to receive a peg-leg tire comprising an axially outer member formed of metal of predetermined gage and including a tire seat, a retaining flange and a portion forming the outer side and radially inward wall of the well, an axially inner member formed of metal of lighter gage including a bead receiving portion, a retaining flange and a portion forming the inner side of the well and underlapping the radially inward portion of said outer member being secured thereto, and a portion extending radially inwardly and forming a bolting-on flange.

6. The combination with a wheel hub and brake drum mounted thereon, said drum having an outwardly extending annular radiating fin, a rim for receiving a peg-leg tire demountably secured to said drum, the axially inner portion of said rim having a bead seat of larger diameter than the bead seat on the outer portion, said inner portion also surrounding said drum and outwardly extending annular radiating fin and terminating in a bead retaining flange, and an annular dust guard secured to said flange and projecting radially inward adjacent to said annular fin but providing clearance for movement over said fin in mounting and demounting the rim.

CHARLES S. ASH.